UNITED STATES PATENT OFFICE.

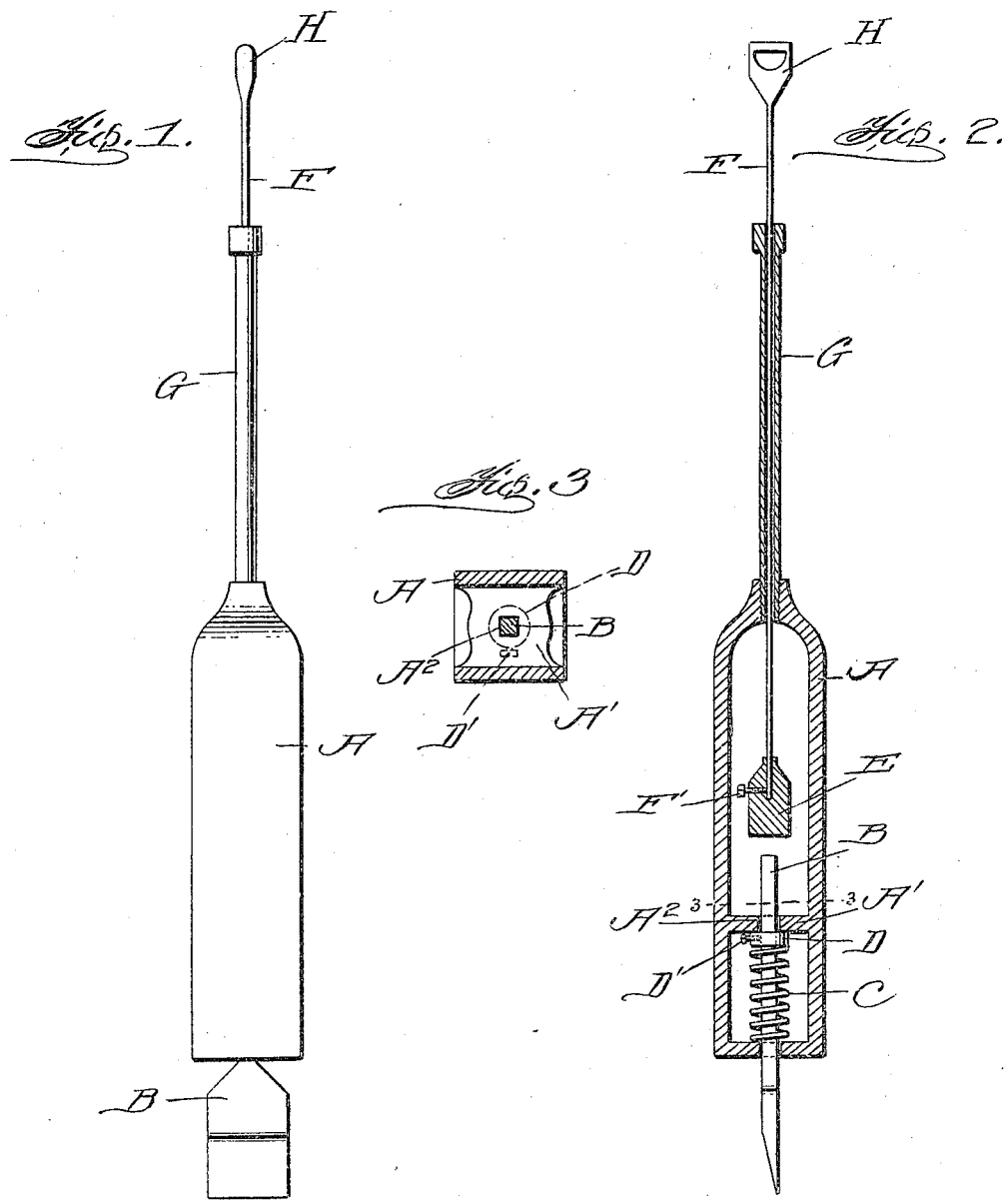

ABEN GUSTAF HOWARD, OF HOLDREGE, NEBRASKA.

HOOF-TRIMMER.

949,796.

Specification of Letters Patent. Patented Feb. 22, 1910.

Application filed March 13, 1909. Serial No. 483,177.

*To all whom it may concern:*

Be it known that I, ABEN G. HOWARD, a citizen of the United States, residing at Holdrege, in the county of Phelps and State of Nebraska, have invented a new and useful Improvemenet in Hoof-Trimmers, of which the following is a specification.

This invention relates to hoof trimmers for trimming the hoofs of animals, the object being to provide a device by means of which the hoofs of an animal can be easily and quickly trimmed without any danger of being hurt.

A further object of the invention is to provide a hoof trimmer which is provided with a cutting tool operated by a sliding hammer carried by a rod whereby said tool can be operated by moving the rod up and down so as to cause the hammer to strike the tool a blow.

A further object of the invention is to provide a hoof trimmer which is exceedingly simple and cheap in construction and one which is composed of a few parts which are so mounted that they can be readily taken apart whereby any of the parts can be readily replaced should they become broken.

A still further object of the invention is to provide a hoof trimmer which is so constructed that the hoofs of an animal can be trimmed by a person holding the device when in an upright position whereby all danger of being kicked by the animal is prevented.

A still further object of the invention is to provide a cutting tool which is returned to its normal position by a spring, said spring being compressed by the force of the blow of the hammer.

A further object of the invention is to provide means for adjusting the tension of the spring said means forming a stop for the cutting tool whereby the upward movement of the same will be controlled.

With these objects in view, the invention consists of the novel features of construction, combination and arrangement of parts hereinafter described, pointed out in the claims and shown in the accompanying drawings, in which, Figure 1 is a side elevation of my improved hoof trimmer. Fig. 2 is a vertical section through the same. Fig. 3 is a section taken on line 3—3 of Fig. 2.

In carrying out my improved invention I employ a frame A provided with a cross bar A′ having an enlarged apertured portion $A^2$ through which is adapted to extend a cutting tool B which is slidably mounted within an opening formed in the bottom of the frame and is surrounded by a coil spring C the lower end of which bears against the bottom of the frame and the upper end against a collar D secured on the tool by a set screw D′ said collar forming a stop for limiting the upward movement of the two and it will be seen that as the tool is forced downwardly the spring will be compressed and as it is released it will be forced upwardly by the spring until the collar engages the cross bar.

This tool may be of any desired shape but is preferably in the form of a chisel so that it can be readily placed over the edge of a hoof of the animal so that when the same is forced downwardly the edge of the hoof will be cut off.

For operating the cutting tool I employ a hammer E provided with a vertical bore in which is secured a rod F by a set screw F′ said rod working in a tube G secured in the upper end of the frame A and having a handle H formed on its upper end for operating the same and it will be seen that by raising the hammer and forcing the same downwardly quickly the hammer will be brought into engagement with the top of the cutting tool so as to cause the same to cut through the hoof when placed thereon. By this arrangement the hoof of the animal can be trimmed by a person standing in an upright position and it is only necessary to grasp the tube of the frame with the hand and guide the tool on the hoof in the desired position, it of course being understood that the animal is standing on a flat surface, and by raising the hammer upwardly and forcing the same downwardly a blow will be struck upon the cutting tool and it will be seen that by repeating this operation the hoof can be trimmed easily and quickly without any danger of the operator being hurt by the animal as in some cases it is necessary to throw the animal down before the hoof can be trimmed. It is only necessary to force the hammer down with a slight pressure as the weight of the same dropping by its own weight will strike a blow upon the cutting tool with sufficient force to trim the ordinary hoof.

From the foregoing description it will be seen that I have provided a hoof trimmer which is so constructed that it can be readily handled and at the same time it can be operated by one hand thereby enabling the operator to trim the hoof of an animal quickly. It will also be seen that this device can be used for other purposes as by removing the cutting tool and placing a punch or any other tool within the same it can be used for punching holes or cutting material of other characters.

What I claim is:—

1. A hoof trimmer comprising a frame provided with an apertured cross-bar in alinement with an aperture formed in the bottom of said frame, a tool slidably mounted within said aperture, a collar secured on said tool forming a stop for the same a spring surrounding said tool between the bottom and said collar, a tube carried by said frame and a rod slidably mounted within said tube carrying a hammer for engaging said tool.

2. A hoof trimmer comprising a frame provided with an opening in its bottom, a cross bar arranged in said frame provided with an opening in alinement with the opening of the bottom, a tool slidably mounted within said openings, a coil-spring surrounding said tool, a collar secured on said tool adapted to engage said cross bar, a tube carried by said frame, a rod provided with a handle at its upper end slidably mounted within said tube and a hammer carried by the lower end of said rod adapted to engage said tool.

ABEN GUSTAF HOWARD.

Witnesses:
J. E. BURGE,
ARCHER GUSTAFSON.